US009527370B2

(12) United States Patent  
Scott et al.

(10) Patent No.: US 9,527,370 B2  
(45) Date of Patent: Dec. 27, 2016

(54) DAMPING AND STIFFENING OF A VEHICLE BODY PANEL

(71) Applicant: FORD GLOBAL TECHNOLOGIES, LLC, Dearborn, MI (US)

(72) Inventors: Jason Douglas Scott, Farmington Hills, MI (US); Bruce Richard Ghastin, Canton, MI (US); Shunmugam Baskar, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/316,064

(22) Filed: Jun. 26, 2014

(65) Prior Publication Data

US 2015/0375604 A1  Dec. 31, 2015

(51) Int. Cl.
*B60J 5/04* (2006.01)
*B62D 25/02* (2006.01)

(52) U.S. Cl.
CPC ........ *B60J 5/04* (2013.01); *B60J 5/045* (2013.01); *B60J 5/0413* (2013.01); *B60J 5/0418* (2013.01); *B60J 5/0454* (2013.01); *B60J 5/0484* (2013.01); *B62D 25/02* (2013.01)

(58) Field of Classification Search
CPC ....... B60J 5/042; B60J 5/04045; B60J 5/0454; B60J 5/0484; B60J 5/0438; B60J 5/0437; B60J 5/0413; B60J 5/0416; B62D 27/04; B32B 1/04; B32B 3/10; B32B 3/26; B32B 7/12; F16F 15/02; F16F 15/04
USPC .......... 296/191, 1.03; 181/207, 208; 428/71, 428/212, 67
See application file for complete search history.

(56) References Cited

U.S. PATENT DOCUMENTS

| | | | | |
|---|---|---|---|---|
| 3,256,669 A | * | 6/1966 | Seiwert ................. | B21D 49/00 52/630 |
| 3,868,796 A | * | 3/1975 | Bush ..................... | B60J 5/0452 296/146.6 |
| 3,964,208 A | * | 6/1976 | Renner ................. | B60J 5/0412 296/146.2 |
| 4,399,174 A | * | 8/1983 | Tanaka et al. .................. | 428/67 |
| 4,444,818 A | * | 4/1984 | Tominaga et al. ........... | 428/34.5 |
| 4,451,518 A | * | 5/1984 | Miura et al. .................. | 428/137 |
| 4,559,252 A | * | 12/1985 | Motoda et al. ................. | 428/57 |
| 4,569,880 A | * | 2/1986 | Nishiyama et al. .......... | 428/212 |
| 4,906,501 A | * | 3/1990 | Honma et al. ................. | 428/68 |
| 5,128,189 A | * | 7/1992 | Bartlett ........................... | 428/71 |
| 5,322,722 A | * | 6/1994 | Rozenberg .................. | 428/40.1 |
| 5,695,867 A |   | 12/1997 | Saitoh et al. | |

(Continued)

FOREIGN PATENT DOCUMENTS

| | | | | |
|---|---|---|---|---|
| GB | 2061196 A | * 5/1981 | ............... | B32B 3/28 |
| WO | WO 2004039577 A2 | * 5/2004 | ............... | B32B 5/00 |

*Primary Examiner* — Katherine Mitchell
*Assistant Examiner* — Marcus Menezes
(74) *Attorney, Agent, or Firm* — Raymond L. Coppiellie; Brooks Kushman P.C.

(57) ABSTRACT

A damping and stiffening assembly for a body panel. The assembly includes a first damping patch and a second damping patch that are attached to the body panel. The assembly also includes a stiffening lamination that has a first end, a middle portion, and a second end. The first end of the stiffening lamination attaches to and overlaps the first damping patch. The middle portion of the stiffening lamination attaches to the body panel. The second end of the stiffening lamination attaches to and overlaps the second damping patch.

20 Claims, 2 Drawing Sheets

(56) References Cited

U.S. PATENT DOCUMENTS

| | | | |
|---|---|---|---|
| 6,291,792 B1* | 9/2001 | Fussnegger | B23K 11/20 |
| | | | 219/118 |
| 6,428,905 B1* | 8/2002 | Behr | E04C 2/292 |
| | | | 228/173.6 |
| 6,482,496 B1 | 11/2002 | Wycech | |
| 6,855,652 B2 | 2/2005 | Hable et al. | |
| 7,211,321 B2* | 5/2007 | Wycech | 428/316.6 |
| 7,238,407 B2 | 7/2007 | Wesch et al. | |
| 7,934,354 B2* | 5/2011 | Uto | B60J 5/045 |
| | | | 114/117 |
| 8,182,025 B2* | 5/2012 | Auchter-Bruening | B60J 7/04 |
| | | | 296/191 |
| 2010/0013255 A1* | 1/2010 | Mantovani et al. | 296/1.03 |
| 2010/0314909 A1* | 12/2010 | Fuchs | B23K 11/11 |
| | | | 296/191 |
| 2016/0136683 A1* | 5/2016 | Pinyayev | B05D 3/007 |
| | | | 428/323 |

\* cited by examiner

DAMPING AND STIFFENING OF A VEHICLE BODY PANEL

TECHNICAL FIELD

The present disclosure relates to damping and stiffening a vehicle body panel.

BACKGROUND

Automobile body panels may require stiffening in order to increase the structural integrity of the body panel. The addition of stiffening components may prevent oil canning and dimpling of the body panel. Oil canning and dimpling may detract from the perceived quality and aesthetically pleasing look of the body panel.

Automobile body panels may also require damping to reduce any noise, vibration, or harshness that may be caused by the resonance within the body panel. The addition of damping components may reduce the noise, vibration, or harshness originating in the body panel. Any noise, vibration, or harshness may tend to decrease customer satisfaction.

This disclosure is directed to solving the above problems and other problems as summarized below.

SUMMARY

In one aspect of the disclosure, a damping and stiffening assembly for a body panel is provided. The assembly includes a first damping patch and a second damping patch that are attached to the body panel. The assembly also includes a stiffening lamination that has a first end, a middle portion, and a second end. The first end of the stiffening lamination attaches to and overlaps the first damping patch. The middle portion of the stiffening lamination attaches to the body panel. The second end of the stiffening lamination attaches to and overlaps the second damping patch.

In another aspect of the disclosure, a vehicle body component is provided. The vehicle body component includes a vehicle body panel, a first damping patch, a second damping patch, and a stiffening panel. The vehicle body panel that has an inboard surface. The first damping patch has an outboard surface and an inboard surface. The outboard surface of the first damping patch is attached to the inboard surface of the vehicle body panel. The second damping patch has an outboard surface and an inboard surface. The outboard surface of the second damping patch is attached to the inboard surface of the vehicle body panel. The stiffening panel has a first end, a middle portion, and a second end. The stiffening panel extends from the first damping patch to the second damping patch. The first end of the stiffening panel is attached to the inboard surface of the first damping patch. The middle portion of the stiffening panel is attached to the inboard surface of the vehicle body panel. The second end of the stiffening patch is attached to the inboard surface of the second damping patch.

In yet another aspect of the disclosure, a vehicle door is provided. The vehicle door includes an aluminum door panel, a first damping patch attached to the door panel, a second damping patch attached to the door panel, and a stiffening lamination. The stiffening lamination has a first end, a middle portion, and a second end. The first end of the stiffening lamination attaches to and overlaps the first damping patch. The middle portion of the stiffening lamination attaches to the door panel. The second end of the stiffening lamination attaches to and overlaps the second damping patch.

The above aspects of this disclosure and other aspects are described in detail below with reference to the attached drawings.

DETAILED DESCRIPTION

Figure 1:
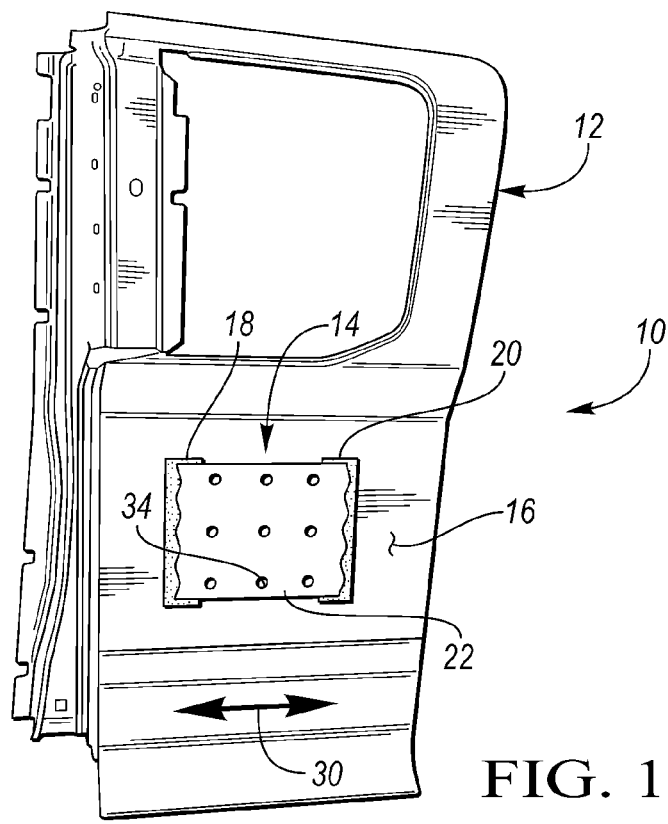
FIG. 1 is a front view of the inboard side of a vehicle body panel, specifically a door panel, including a damping and stiffening assembly.

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Stiffening laminations (also known as beta braces or stiffening panels) are used to reinforce and increase the structural integrity of a vehicle body panel. Stiffening laminations used in vehicle body panels may be made from composite materials such as fiber-reinforced plastics. Fiber-reinforced plastics (also known as fiber-reinforced polymers) are composite materials made of a polymer matrix reinforced with fibers. The fibers may be glass, carbon, basalt, aramid or other appropriate reinforcing materials. The polymer may be an epoxy, vinylester, polyester thermosetting plastic, phenol formaldehyde resin, or other appropriate polymer or plastic. Fiber-reinforced plastics may also be heat and/or pressure cured.

Stiffening laminations may be assembled to the interior surface of the vehicle body panel with an adhesive while they are in an uncured state and then heat cured during the paint baking cycle in the paint shop of an automobile assembly plant. The vehicle body panel expands while the stiffening lamination is cured during the paint baking cycle. The vehicle body panel retracts when it is cooled after the paint baking cycle. Read through (seeing an outline of the stiffing lamination on the side of the panel opposite to where the stiffening lamination has been placed) may be an issue after the vehicle body panel retracts and the stiffening lamination is cured. Read through may occur where the edges of the stiffening lamination are substantially perpendicular to the direction the grain of the material used in the construction of the vehicle body panel. Read through may be especially prominent when the vehicle body panel is made from aluminum sheet. Placing scallops along the edges of the stiffening lamination may diminish the extent of read though. Scallops may not be sufficient in vehicle body panels that are made from thinner and lighter materials, such as aluminum sheeting.

Damping patches (also known as mastic patches) are used to reduce any noise, vibration, or harshness, that may be caused by the resonance within the vehicle body panel. Damping patches are also stuck to the interior surface of the vehicle body panel.

Damping patches are commonly made up from elastic materials or viscoelastic materials such as un-vulcanized rubber, asphalt, rubber asphalt, elastomer materials, or other appropriate materials. Elastomer materials may include vulcanized rubber and thermoplastic elastomers. Thermoplastic elastomers may include polyurethane elastomers, polyester elastomers, polyamide elastomers, polystyrene elastomers, fluoro-based elastomers and the like. Damping patches may also be made from resin materials which are very flexible, such as soft polyvinyl chloride. The elastic or viscoelastic materials of the damping patches are commonly held together and contained by an outer layer made from a thin retaining material, such as a thin plastic or aluminum foil.

The damping patches may be placed between the vehicle body panel and the edges of the stiffening lamination that are substantially perpendicular to the direction of the grain of the material making up the vehicle body panel. The middle portion the stiffening lamination is placed against the vehicle body panel. This configuration may be used to reduce read through caused by the stiffening lamination.

Referring to FIG. 1, a vehicle body component 10 is illustrated. The vehicle body component 10 includes a body panel 12, which may be made from steel, aluminum, or other appropriate materials. The body panel 12 may specifically be a door panel for a vehicle door. The vehicle body component 10 also includes a damping and stiffening assembly 14 that is attached to an inboard surface 16 of the body panel 12. The term 'inboard' is used to describe a surface that will face the interior of a vehicle when a component, such as the body panel 12, is assembled onto the vehicle. The term 'outboard' is used to describe a surface that will face away from the interior of the vehicle when a component, such as the body panel 12, is assembled onto the vehicle.

Figure 2:
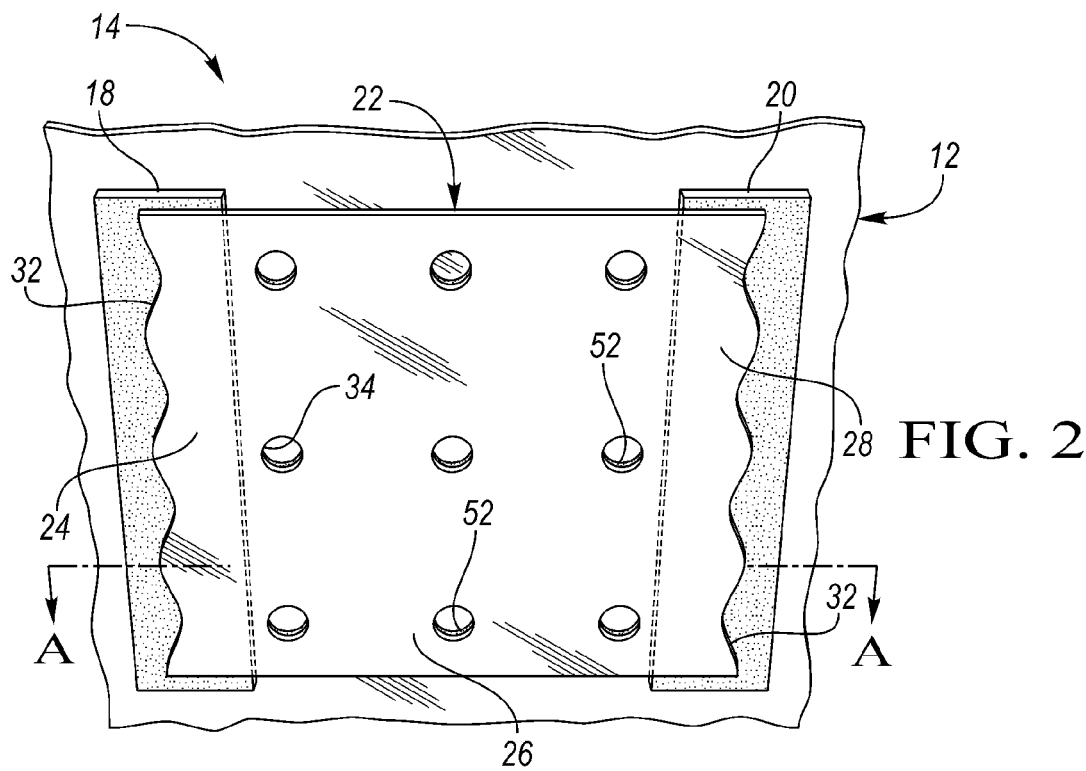
FIG. 2 is a front view of a damping and stiffening assembly.

Referring to FIGS. 1 and 2, the damping and stiffening assembly 14 includes a first damping patch 18 and a second damping patch 20 that are both attached to the inboard surface 16 of the vehicle body panel 12. The first damping patch 18 and the second damping patch 20 may both be substantially rectangular in shape.

The damping and stiffening assembly 14 also includes a stiffening lamination (also known as a stiffening panel) 22. The stiffening lamination 22 has a first end 24, a middle portion 26, and a second end 28. The first end 24 of the stiffening lamination 22 attaches to and overlaps the first damping patch 18. The middle portion 26 of the stiffening lamination 22 attaches to the body panel 12. The second end 28 of the stiffening lamination 22 attaches to and overlaps the second damping patch 20.

The stiffening lamination 22 may be substantially rectangular in shape and extends from the first damping patch 18 to the second damping patch 20 along a grain direction 30 of the material making up the body panel 12. The stiffening lamination 22 may have scalloped edges 32. The scalloped edges 32 may be the edges that are substantially perpendicular to the grain direction 30 of the body panel 12 material.

The stiffening lamination 22 may be made from a fiber-reinforced plastic or more specifically, a heat curable fiber-reinforced plastic. The stiffening lamination 22 may have out-gassing holes 34 that allow gases to escape during the chemical reaction that occurs when the fiber-reinforced plastic stiffening lamination 22 is cured.

Figure 3:
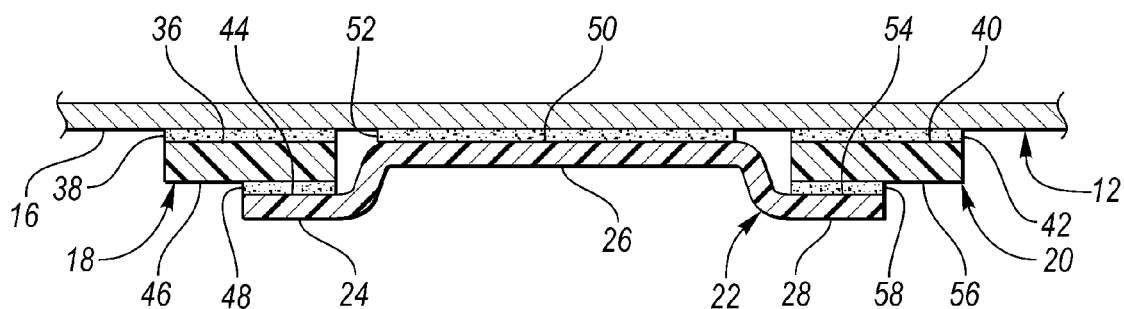
FIG. 3 is a cross-sectional view of a damping and stiffening assembly attached to a vehicle body panel taken along line A-A in FIG. 2.

Referring to FIG. 3, the first damping patch 18 may have a first attachment surface (also known as an outboard surface) 36 that is attached to the inboard surface 16 of the body panel 12. The first attachment surface 36 of the first damping patch 18 may be connected to the inboard surface 16 of the body panel 12 by an adhesive layer 38.

The second damping patch 20 may have a first attachment surface (also known as an outboard surface) 40 that is attached to the inboard surface 16 of the body panel 12. The first attachment surface 40 of the second damping patch 20 may be connected to the inboard surface 16 of the body panel 12 by an adhesive layer 42.

The first end 24 stiffening lamination 22 may have a first attachment surface 44 that is attached to an inboard surface 46 of the first damping patch 18. The first attachment surface 44 of the stiffening lamination 22 may be connected to the inboard surface 46 of the first damping patch 18 by an adhesive layer 48.

The middle portion 26 of the stiffening lamination 22 may have a second attachment surface 50 that is attached to the inboard surface 16 of the body panel 12. The middle portion 26 of the stiffening lamination 22 may be connected to the inboard surface 16 of the body panel 12 by an adhesive layer 52.

The second end 28 stiffening lamination 22 may have a third attachment surface 54 that is attached to an inboard surface 56 of the second damping patch 20. The third attachment surface 54 of the stiffening lamination 22 may be connected to the inboard surface 56 of the second damping patch 20 by an adhesive layer 58.

The adhesive layers 38, 42, 48, 52, and 58 may be comprised of hardenable pressure sensitive adhesives. Pressure sensitive adhesives are sticky in the uncured state, but have a strong adhesive force when cured by heating (thermo-curing type), irradiation by light (light curing type), or by being blocked from air (anaerobically curing type). Specifically, the adhesive layers 38, 42, 48, 52, and 58 may be heat cured pressure sensitive adhesives that are cured during the paint baking cycle in the paint shop of an automobile assembly plant.

Figure 4:
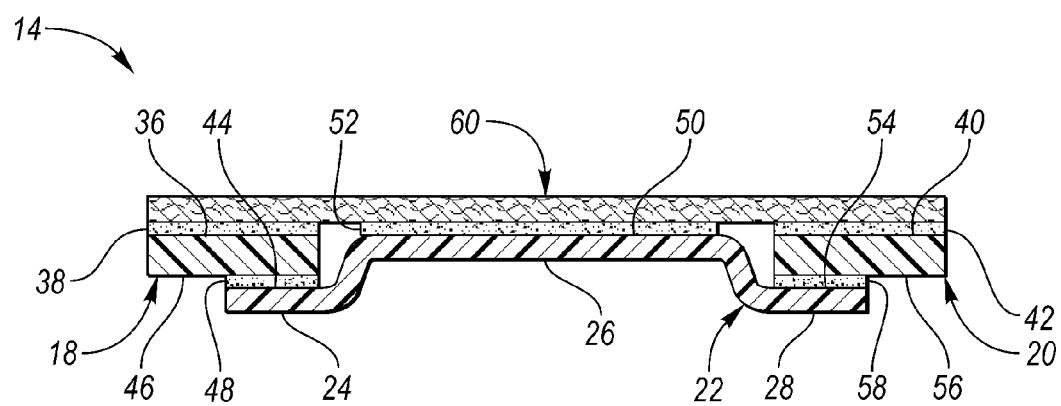
FIG. 4 is a cross-sectional view of the damping and stiffening assembly including a release liner and not attached to the vehicle body panel taken along line A-A in FIG. 2.

Referring to FIG. 4, the damping and stiffening assembly 14 may be constructed as a single unit before being placed onto the body panel 12. A release liner 60 may be placed over the adhesive layers 38, 42, and 52. The release liner 60 is removed before the damping and stiffening assembly 14 is placed onto the body panel 12.

Constructing the damping and stiffening assembly 14 as a single unit reduces the cycle time that would otherwise be required if the damping patches 18, 20 and stiffening lamination 22 are separately placed onto the vehicle body panel 12.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A damping and stiffening assembly for a body panel comprising:

first and second separate elastic damping patches spaced apart from one another and each attached to the body panel; and a stiffening panel having a first side portion, a middle portion, and a second side portion, wherein the first side portion includes a first proximal end that is secured to the middle portion and a first distal end that is directly attached to, overlaps, and terminates over the first elastic damping patch, the middle portion is directly attached to the body panel, and the second side portion includes a second proximal end that is attached to the middle portion and a second distal end that is directly attached to, overlaps, and terminates over the second elastic damping patch.

2. The damping and stiffening assembly of claim 1, wherein a first attachment surface of the first elastic damping patch is directly attached to an inboard surface of the body panel and a first attachment surface of the second elastic damping patch is directly attached to the inboard surface of the body panel.

3. The damping and stiffening assembly of claim 2, wherein the first side portion of the stiffening panel is directly attached to an inboard surface of the first elastic damping patch, the middle portion of the stiffening panel is directly attached to the inboard surface of the body panel, and the second side portion of the stiffening panel is directly attached to an inboard surface of the second elastic damping patch.

4. The damping and stiffening assembly of claim 1, wherein the first side portion and second side portion of the stiffening panel have scalloped edges.

5. The damping and stiffening assembly of claim 1, wherein the body panel is made from aluminum.

6. The damping and stiffening assembly of claim 1, wherein the stiffening panel is made from a heat curable fiber-reinforced plastic.

7. The damping and stiffening assembly of claim 1, wherein the middle portion of the stiffening panel is offset from the first side portion and the second side portion.

8. The damping and stiffening assembly of claim 1, wherein the stiffening panel is directly attached to the first elastic damping patch, the second elastic damping patch, and the body panel via an adhesive.

9. A vehicle body component comprising:
a vehicle body panel having an inboard surface;
a first elastic damping patch having an outboard surface and an inboard surface, the outboard surface directly attached to the inboard surface of the vehicle body panel;
a second elastic damping patch, spaced apart from the first elastic damping patch, having an outboard surface and an inboard surface, the outboard surface directly attached to the inboard surface of the vehicle body panel; and
a stiffening panel having a first side portion, a middle portion, and a second side portion, the stiffening panel extending from the first elastic damping patch to the second elastic damping patch, wherein the first side portion includes a first proximal end that is secured to the middle portion and a first distal end that is directly attached to, overlaps, and terminates over the inboard surface of the first elastic damping patch, the middle portion is directly attached to the inboard surface of the vehicle body panel, and the second side portion includes a second proximal end that is attached to the middle portion and a second distal end that is directly attached to, overlaps, and terminates over the inboard surface of the second elastic damping patch.

10. The vehicle body component of claim 9, wherein the first side portion of the stiffening panel has a first attachment surface that is directly attached to the inboard surface of the first elastic damping patch, the middle portion of the stiffening panel has an second attachment surface that is directly attached to the inboard surface of the vehicle body panel, and the second side portion of the stiffening panel has a third attachment surface that is directly attached to the inboard surface of the second elastic damping patch.

11. The vehicle body component of claim 10, wherein first side portion and second side portion of the stiffening panel have scalloped edges.

12. The vehicle body component of claim 9, wherein the vehicle body panel is made from aluminum.

13. The vehicle body component of claim 9, wherein the stiffening panel is made from a heat curable fiber-reinforced plastic.

14. The vehicle body component of claim 9, wherein the middle portion of the stiffening panel is offset from the first side portion and the second side portion.

15. The vehicle body component of claim 9, wherein the stiffening panel is directly attached to the first elastic damping patch, the second elastic damping patch, and the vehicle body panel via an adhesive.

16. A vehicle door comprising:
a door panel;
first and second separate elastic damping patches spaced apart from one another and secured to the panel; and
a stiffening panel having two side portions extending outward from a middle portion secured to the door panel, proximal ends of the side portions are secured to the middle portion and distal ends of the side portions are secured to, overlap, and terminate over the first and second patches, respectively.

17. The vehicle door of claim 16, wherein the side portions have scalloped edges.

18. The vehicle door of claim 16, wherein the stiffening panel is made from a heat curable fiber-reinforced plastic.

19. The vehicle door of claim 16, wherein the middle portion of the stiffening panel is offset from the first end and the second end.

20. The vehicle door of claim 16, wherein the stiffening panel is directly attached to the first elastic damping patch, the second elastic damping patch, and the door panel via an adhesive.

* * * * *